United States Patent
Du et al.

(10) Patent No.: US 10,943,166 B2
(45) Date of Patent: Mar. 9, 2021

(54) POOLING OPERATION DEVICE AND METHOD FOR CONVOLUTIONAL NEURAL NETWORK

(71) Applicant: Kneron, Inc., San Diego, CA (US)

(72) Inventors: Yuan Du, Los Angeles, CA (US); Li Du, La Jolla, CA (US); Chun-Chen Liu, San Deigo, CA (US)

(73) Assignee: Kneron, Inc., San Diego, CA (US)

( * ) Notice: Subject to any disclaimer, the term of this patent is extended or adjusted under 35 U.S.C. 154(b) by 66 days.

(21) Appl. No.: 15/802,092

(22) Filed: Nov. 2, 2017

(65) Prior Publication Data
US 2018/0232629 A1   Aug. 16, 2018

(30) Foreign Application Priority Data
Feb. 10, 2017 (TW) .............................. 106104512 A (51) Int. Cl.
  *G06N 3/04* (2006.01)
  *G06N 3/063* (2006.01)
(52) U.S. Cl.
  CPC ............. *G06N 3/04* (2013.01); *G06N 3/0454* (2013.01); *G06N 3/063* (2013.01)
(58) Field of Classification Search
  CPC ............. G06N 3/04; G06N 3/02; G06N 3/084
  See application file for complete search history.

(56) References Cited

U.S. PATENT DOCUMENTS

| | | | | |
|---|---|---|---|---|
| 10,621,486 | B2* | 4/2020 | Yao | G06F 7/483 |
| 2017/0169327 | A1* | 6/2017 | Nestler | G06N 3/04 |
| 2017/0228634 | A1* | 8/2017 | Tomita | G06N 3/0454 |
| 2018/0129936 | A1* | 5/2018 | Young | G06N 3/04 |
| 2018/0189238 | A1* | 7/2018 | Lau | G06N 3/08 |
| 2018/0189642 | A1* | 7/2018 | Boesch | G06F 17/505 |

FOREIGN PATENT DOCUMENTS

| | | |
|---|---|---|
| CN | 106203619 A | 12/2016 |
| CN | 106228240 A | 12/2016 |
| CN | 106250863 A | 12/2016 |

OTHER PUBLICATIONS

Pavel Krcal and Wang Yi, "Communicating Timed Automata: The More Synchronous, the More Difficult to Verify", 2006, CAV 2006, LNCS 4144, pp. 249-262. (Year: 2006).*

(Continued)

*Primary Examiner* — Kamran Afshar
*Assistant Examiner* — Ying Yu Chen
(74) *Attorney, Agent, or Firm* — Muncy, Geissler, Olds & Lowe, P.C.

(57) ABSTRACT

A pooling operation method for a convolutional neural network includes the following steps of: reading multiple new data in at least one current column of a pooling window; performing a first pooling operation with the new data to generate at least a current column pooling result; storing the current column pooling result in a buffer; and performing a second pooling operation with the current column pooling result and at least a preceding column pooling result stored in the buffer to generate a pooling result of the pooling window. The first pooling operation and the second pooling operation are forward max pooling operations.

8 Claims, 8 Drawing Sheets

(56) References Cited

OTHER PUBLICATIONS

Yuan Du, Li Du, Yilei Li, Junjie Su, and Mau-Chung Frank Chang, "A Streaming Accelerator for Deep Convolutional Neural Networks with Image and Feature Decomposition for Resource-limited System Applications", Sep. 15, 2017, arXiv, https://arxiv.org/abs/1709.05116 pp. 1-5. (Year: 2017).*

Li Du, Yuan Du, Yilei Li, Junjie Su, Yen-Cheng Kuan, Chun-Chen Liu, and Mau-Chung Frank Chang, "A Reconfigurable Streaming Deep Convolutional Neural Network Accelerator for Internet of Things", Aug. 16, 2017, IEEE, pp. 198-208. (Year: 2017).*

Tianqi Tang, Lixue Xia, Boxun Li, Yu Wang, and Huazhong Yang, "Binary Convolutional Neural Network on RRAM", Jan. 2017, 2017 22nd Asia and South Pacific Design Automation Conference (ASP-DAC), pp. 782-787. (Year: 2017).*

Ruo Long Lian, "A Framework for Fpga-Based Acceleration of Neural Network Inference with Limited Numerical Precision via High-Level Synthesis with Streaming Functionality", 2016, University of Toronto TSpace, https://tspace.library.utoronto.ca/handle/1807/72751 pp. i-103. (Year: 2016).*

\* cited by examiner

POOLING OPERATION DEVICE AND METHOD FOR CONVOLUTIONAL NEURAL NETWORK

CROSS REFERENCE TO RELATED APPLICATIONS

This Non-provisional application claims priority under 35 U.S.C. § 119(a) on Patent Application No(s). 106104512 filed in Taiwan, Republic of China on Feb. 10, 2017, the entire contents of which are hereby incorporated by reference.

BACKGROUND OF THE INVENTION

Field of Invention

The present disclosure relates to a pooling operation method and, in particular, to a device and a method for performing max pooling operation.

Related Art

Convolutional neural network (CNN) is a feedforward neural network and usually includes a plurality of convolution layers and pooling layers. The convolution layers can retrieve the partial characteristics of inputted data, and the pooling layers can perform max pooling operations or average pooling operations with respective to the specific characteristics of a selected area in the inputted data, thereby reducing the amount of parameters and the operations in the neural network. The results of the pooling operations can be provided to the next convolution operation for performing next pooling operations. However, when performing pooling operations with multiple data, it is necessary to wait for completing the operations of all data in the convolution layers, and then to input the results to the pooling layers for performing the pooling operations. Accordingly, the conventional calculations need a large reading bandwidth.

Therefore, it is desired to provide a pooling operation method for solving the issue of requiring large reading bandwidth.

SUMMARY OF THE INVENTION

In view of the foregoing, an objective of the disclosure is to provide a pooling operation device and method that can reduce the required reading bandwidth for inputted data and thus enhance the pooling operation performance.

To achieve the above objective, the present disclosure provides a pooling operation method for a convolutional neural network, which includes the following steps of: reading multiple new data in at least one column of a pooling window; performing a first pooling operation with the new data to generate at least a column pooling result; storing the column pooling result in a buffer; and performing a second pooling operation with the column pooling result and at least a preceding column pooling result stored in the buffer to generate a pooling result of the pooling window.

In one embodiment, the new data is a result of a convolution operation, and the new data are not stored in the buffer before the reading step.

In one embodiment, the buffer is an FIFO buffer, and the new data are new data of at least a column of the pooling window.

In one embodiment, the size of the buffer is greater than or equal to a number of rows of the pooling window.

In one embodiment, a stride of the pooling window is S, and the step of preforming the second pooling operation is after the buffer stores S of the column pooling results.

In one embodiment, the first pooling operation and the second pooling operation are max pooling operations.

To achieve the above objective, the present disclosure also provides a pooling operation device of a convolutional neural network, which includes a first-order pooling unit, a buffer, and a second-order pooling unit. The first-order pooling unit is configured for reading multiple new data in at least one column of a pooling window, and performing a first pooling operation with the new data to generate at least one column pooling result. The buffer is coupled to the first-order pooling unit for storing the column pooling result and at least one preceding column pooling result. The second-order pooling unit is configured for performing a second pooling operation with the column pooling result and the preceding column pooling result stored in the buffer to generate a pooling result of the pooling window.

In one embodiment, the new data is a result of a convolution operation, and the new data are not stored in the buffer before the first-order pooling unit reads the new data.

In one embodiment, the buffer is an FIFO buffer, and the new data are new data of at least a column of the pooling window.

In one embodiment, the size of the buffer is greater than or equal to a number of rows of the pooling window.

In one embodiment, a stride of the pooling window is S, and the second pooling operation is performed after the buffer stores S of the column pooling results.

In one embodiment, the first pooling operation and the second pooling operation are max pooling operations.

To achieve the above objective, the present disclosure also provides a pooling operation method for a convolutional neural network, which includes the following steps of: reading at least one prepared data in a pooling window, wherein the pooling window further comprises unprepared data; performing a pooling operation with the prepared data to generate a partial pooling result; and after the unprepared data in the pooling window become new prepared data, performing the pooling operation again with the new prepared data and the partial pooling result to generate a pooling result.

In one embodiment, the pooling operation is a max pooling operation.

To achieve the above objective, the present disclosure further discloses a pooling operation device of a convolutional neural network capable of performing the above methods.

To achieve the above objective, the present disclosure further provides a pooling operation device, which includes a plurality of pooling units and a buffer. Each of the pooling units includes a plurality of inputs and an output. The buffer is configured for receiving a pooling result from the output of one of the pooling units during a current pooling operation, and outputting the pooling result to one of the inputs of another one of the pooling units during a next pooling operation.

In one embodiment, the one of the inputs of the one of the pooling units is a placeholder, and the one of the inputs of the another one of the pooling units is a placeholder.

In one embodiment, the inputs of the pooling units are from a plurality of convolution operation results, and the pooling units perform corresponding operations based on a pooling window at different positions. A stride of the pooling window is S, and adjacent two of the pooling units have S non-overlapped inputs.

In one embodiment, one of the pooling units is an end pooling unit, and another one of the pooling units is a start pooling unit.

To achieve the above objective, the present disclosure further provides a pooling operation method, which includes the following steps of: performing a plurality of pooling operations in a current pooling operation procedure; registering a result of one of the pooling operations; and providing the registered result of the pooling operation as an input of another pooling operation in a next pooling operation procedure.

As mentioned above, the operation device and method of the disclosure have pooling units of two orders connected in series for performing overlapping pooling operation. The first-order pooling unit can perform a first round of operation with the data of the column to generate an output result, which is saved in the FIFO buffer. After the first-order pooling unit performs a second round of operation with the data of the next column, the new output result can replace at least one of the output results of the first-round operation stored in the buffer. Then, all of the pooling operation results stored in the FIFO buffer are outputted to the second-order pooling units for performing the second-order pooling operation, thereby obtaining the finial pooling operation result. When a part of the row data in the pooling window is not yet processed by the convolution operation, it is possible to perform the pooling operation with the row data that have been processed by the pooling operation. The obtained partial pooling operation results can be stored in the row buffer. After the new data in the pooling window are processed by the convolution operation, the new data and the partial pooling operation results stored in the row buffer are provide to perform the column pooling operation so as to obtain the final pooling operation result. Accordingly, the operation device and method of the disclosure can perform the pooling operations for a large amount of data with limited reading bandwidth, thereby enhancing the pooling operation performance.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
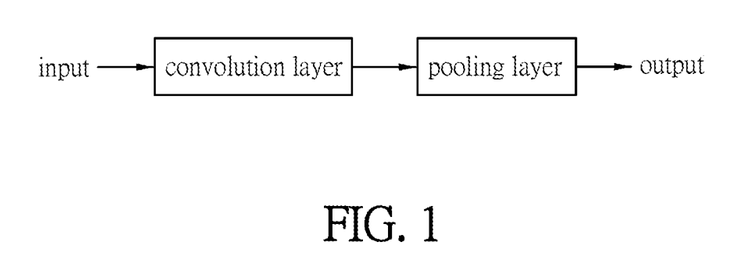
FIG. 1 is a schematic diagram showing a convolutional neural network.

FIG. 1 is a schematic diagram showing a convolutional neural network. As shown in FIG. 1, the convolutional neural network includes a plurality of operation layers such as the convolution layers and pooling layers. The convolutional neural network may include a plurality of convolution layers and a plurality of pooling layers. The output of each layer can be the input of another layer or a consecutive layer. For example, the output of the Nth convolution layer can be the input of the Nth pooling layer or another consecutive layer, the output of the Nth pooling layer can be the input of the (N+1)th pooling layer or another consecutive layer, and the output of the Nth operation layer can be the input of the (N+1)th operation layer.

In order to enhance the operation performance, the operations of different layers but similar characteristics can be optionally integrated. For example, the pooling operation of the pooling layer is an average pooling operation, and the division calculation can be integrated in the next operation layer. The next operation layer is, for example, a convolution layer, so that the division calculation of the average pooling operation in the pooling layer and the convolution multiplication calculation of the next convolution layer can be performed together. In addition, the pooling layer can perform a shifting operation to replace the needed division calculation of the average pooling operation, and a part of the data, which are not processed with the division calculation yet, can be integrated and calculated in the next operation layer. In other words, a part of the data, which are not processed with the placed shifting operation, can be calculated in the convolution multiplication calculation of the next convolution layer.

Figure 2:
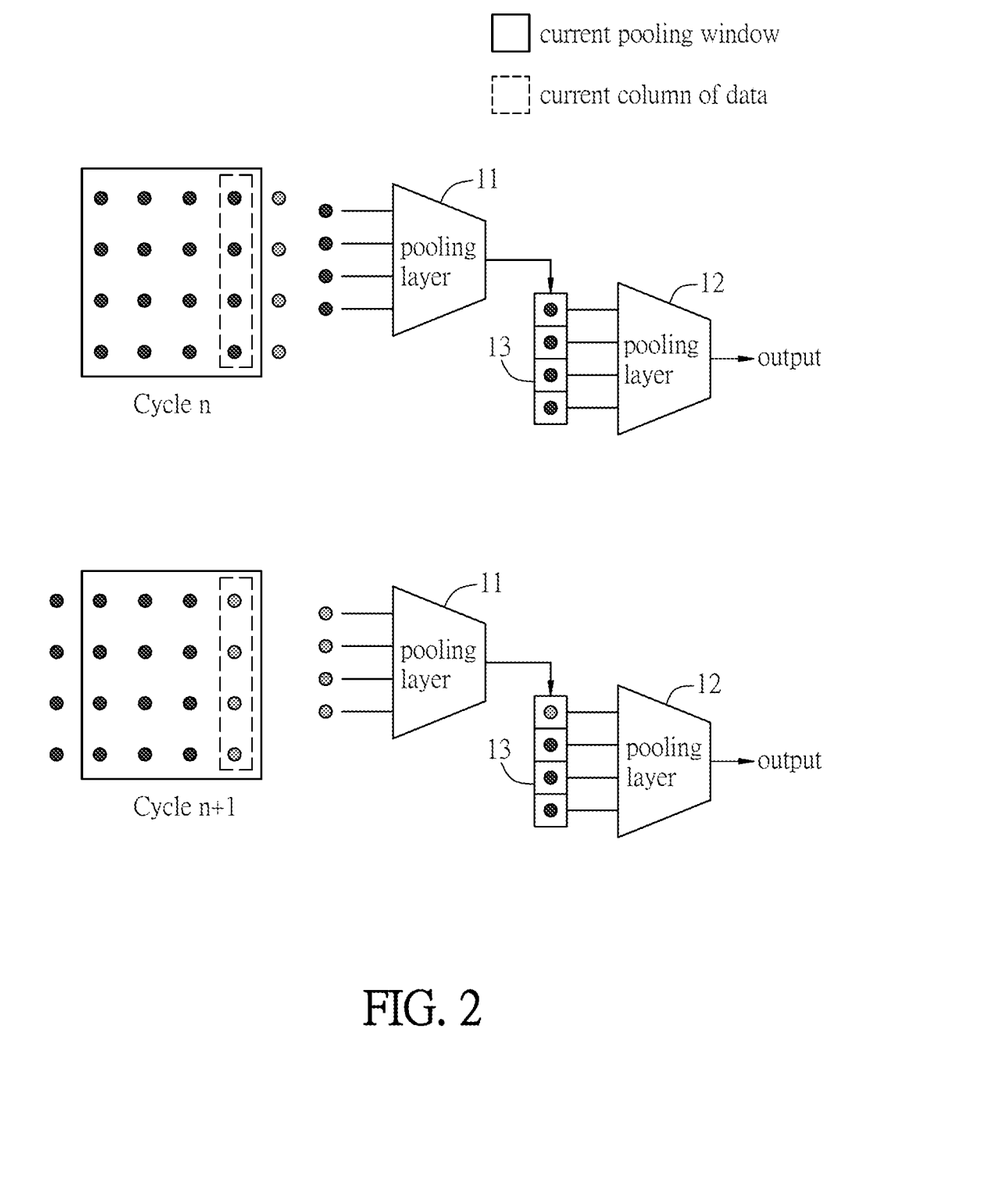
FIG. 2 is a schematic diagram showing an overlapping pooling operation according to an embodiment of the disclosure.

FIG. 2 is a schematic diagram showing an overlapping pooling operation according to an embodiment of the disclosure. As shown in FIG. 2, the pooling operation device includes two pooling units 11 and 12 and a buffer 13. The buffer 13 is a FIFO buffer and is coupled between the pooling unit 11 and the pooling unit 12. The pooling unit 11 is configured for reading multiple new data in at least one column of a pooling window and performing a first pooling operation with the new data to generate at least one column pooling result. For example, the pooling unit 11 can read a column or multiple columns in the pooling window or a row or multiple rows in the pooling window for performing the first pooling operation. The new data are the output results of convolution operation, and usually contain two dimensional data (with multiple columns and multiple rows).

The pooling unit 11 can perform the overlapping pooling operation with the output results of the convolution operation by moving the pooling window for a stride. The buffer 13 is configured for storing the pooling results outputted from the pooling unit 11. The size of the buffer 13 must be greater than or equal to a number of rows of the pooling window. The pooling unit 12 is configured for performing a second pooling operation with the current pooling result and a preceding pooling result stored in the buffer 13 so as to generate a finial pooling result of the pooling window. In addition, each of the first pooling operation and the second pooling operation can be a max pooling operation or an average pooling operation. In the following embodiments, the first pooling operation and the second pooling operation are max pooling operations.

As shown in FIG. 2, the pooling unit 11 is a first-order pooling unit, and the pooling unit 12 is a second-order pooling unit. The buffer is coupled between the pooling units 11 and 12. The size of the pooling window is 4×4, and the stride thereof is 1. Accordingly, the pooling window will move to right for one column in every operation cycle. At first, the pooling unit 11 reads a column of data in the pooling window for performing a first pooling operation, and the output result of the first pooling operation is stored in the buffer 13. In the next operation cycle, the pooling window moves to right for one column, and the pooling unit 11 reads a column of new data in the pooling window, which are not overlapped with the data in the pooling window during the previous operation cycle. The output result of the first pooling operation for the new data is stored in the buffer 13 to replace one of the pooling result that is stored in the buffer 13 in the previous round operation.

Next, the pooling unit 12 reads the pooling result of the current round and the pooling result of the previous round that are stored in the buffer 13, and performs a second pooling operation with the pooling results of the current round and the previous round to obtain the final pooling result of the pooling window. In this embodiment, the stride of the pooling window is 1. When the stride of the pooling window is S, the second pooling operation can be performed after the buffer 13 stores S new pooling results. For example, when the stride of the pooling window is 2, the second pooling operation is not performed when the buffer 13 stores a new pooling result, and will be performed once the buffer 13 stores another new pooling result (totally two new pooling results). In other words, the second pooling operation can be performed once the buffer 13 stores S new pooling results. If the buffer 13 needs K clocks for finishing the storing procedure of one new pooling result (K is an integral greater than or equal to 1), the second pooling operation can be performed after waiting for a period of S×K.

Figure 3:
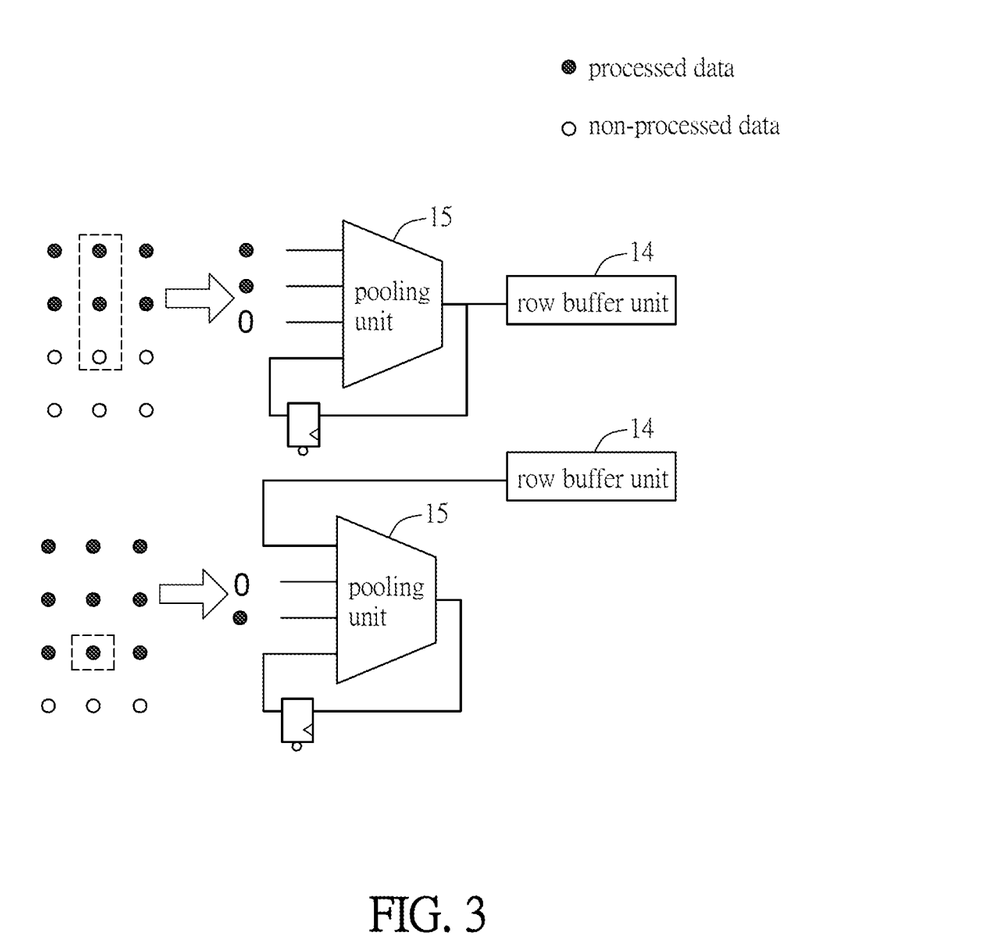
FIG. 3 is a schematic diagram showing the pooling operation according to an embodiment of the disclosure.

FIG. 3 is a schematic diagram showing the pooling operation according to an embodiment of the disclosure. Referring to FIG. 3, when only a part of the row of data of the data inputted to the convolution layer has been processed with the convolution operation, the two step pooling operations can be used. In more detailed, the row of data that have been processed with the convolution operation are retrieved to perform the pooling operation, and the pooling operation result is registered in the row buffer unit as the partial pooling result. After the residual row of data in the convolution layer are all processed with the convolution operation, the new data and the partial pooling result stored in the row buffer unit are calculated to obtain the final pooling result.

For example, only the first and second rows of data in the pooling window of the pooling unit 15 have been processed with the convolution operation, and the third row of data in the pooling window are not processed with the convolution operation yet. The pooling unit 15 can perform a first-order pooling operation with the first and second rows of data so as to output the partial pooling result, which is registered in the row buffer unit 14. After the third row of data are processed with the convolution operation, the pooling unit 15 can perform a second-order pooling operation. In the second-order pooling operation, the pooling unit 15 can calculate the final pooling result according to the third row of data and the partial pooling result stored in the row buffer unit 14.

Figure 4A:
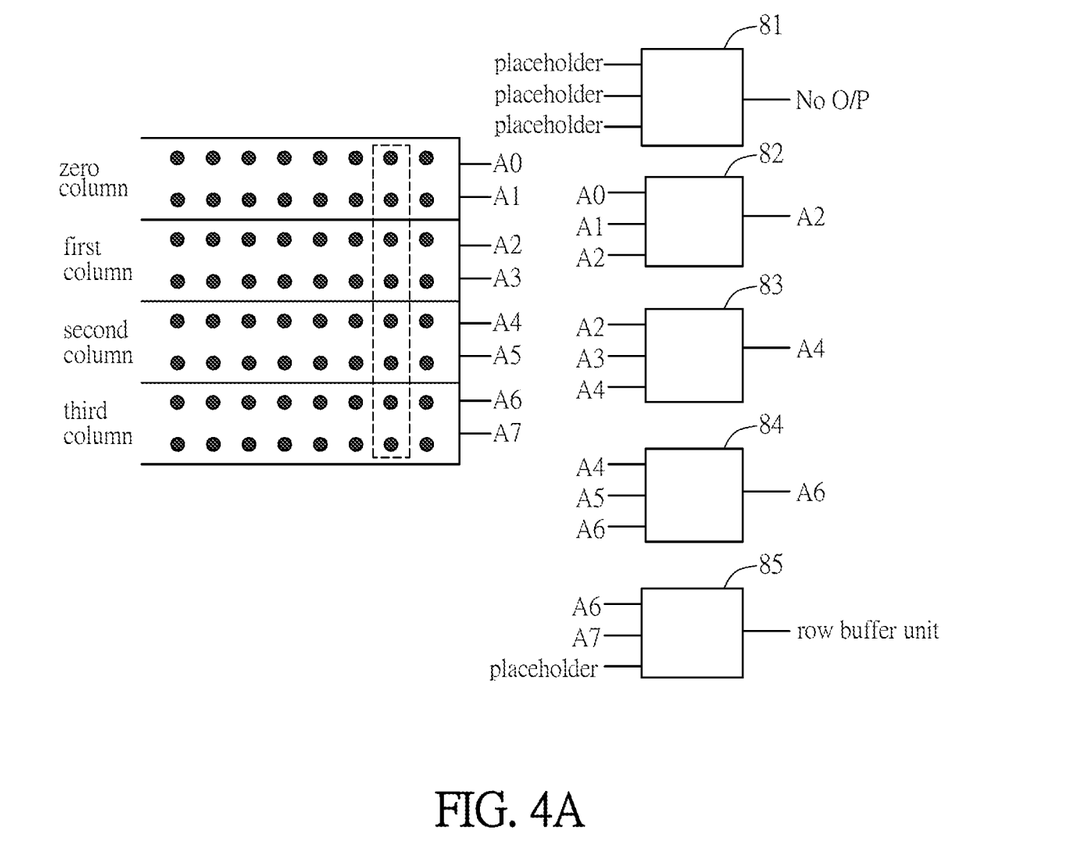
FIGS. 4A and 4B are schematic diagrams showing the pooling operations according to another embodiment of the disclosure.
Figure 4B:
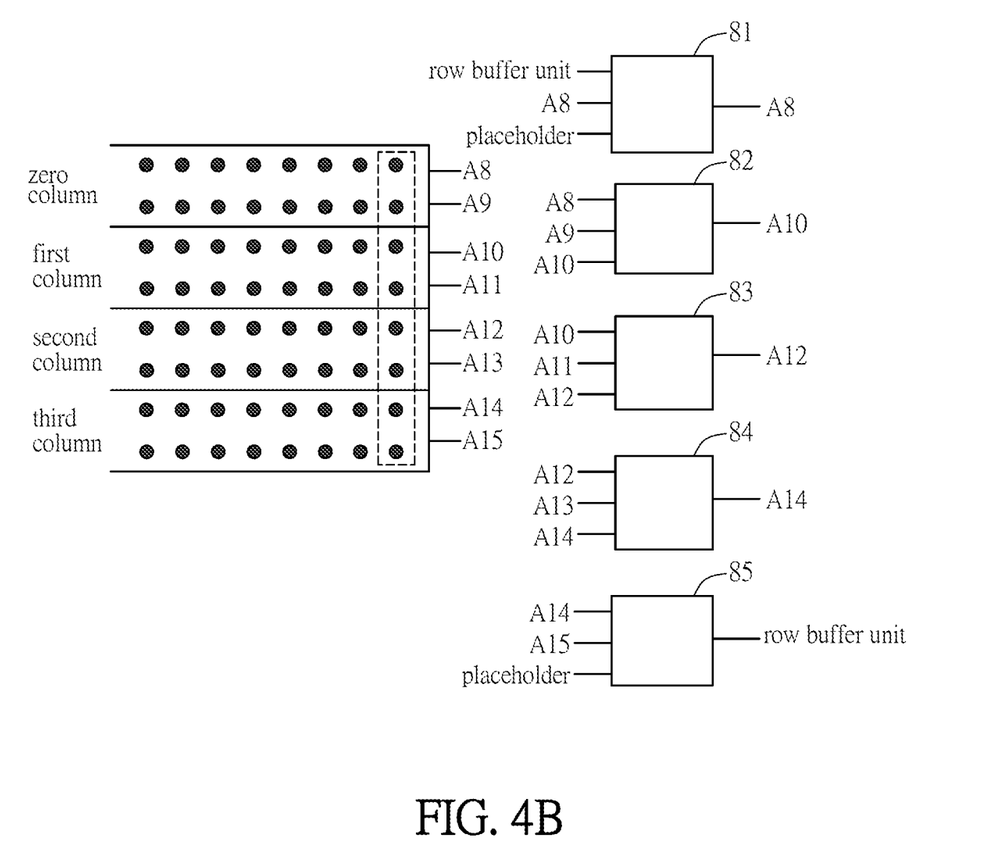

FIGS. 4A and 4B are schematic diagrams showing the pooling operations according to another embodiment of the disclosure. As shown in FIG. 4A, the pooling operation device includes a plurality of pooling units 81~85 and a row buffer unit. Each of the pooling units 81~85 includes a plurality of inputs and an output, and can perform multiple pooling operations with the convolution results. The row buffer unit can receive a pooling result from the output of one of the pooling units during a current pooling operation, and output the pooling result to one of the inputs of another pooling unit during a next pooling operation. In the current pooling operation, the pooling operation device can perform multiple pooling operations and register the result of one of the pooling operations in the row buffer unit. In the next pooling operation, the registered pooling operation result can be retrieved and provided as the input of another pooling operation.

As mentioned above, the data read from the memory in one reading procedure are usually several bits, and the inputted data for multiple pooling units may be greater than the amount of data available in one reading. Thus, the configuration of the row buffer unit can prevent the step of repeatedly reading the data from the memory.

For example, in the current pooling operation, the pooling units 81~85 can read the data A0~A7 of the 0~3 columns. The pooling unit 82 performs the pooling operation with the data A0~A2, and the outputted result of the pooling operation is stored at the address A2. The pooling unit 83 performs the pooling operation with the data A2~A4, and the outputted result of the pooling operation is stored at the address A4. The pooling unit 84 performs the pooling operation with the data A4~A6, and the outputted result of the pooling operation is stored at the address A6. The pooling unit 85 performs the pooling operation with the data A6~A7 and a placeholder, and the outputted result of the pooling operation is registered in the row buffer unit. In the next pooling operation as shown in FIG. 4B, the pooling result registered in the row buffer unit is provided to one of the inputs of the pooling unit 81. The pooling result registered in the row buffer unit and the data A8~A15 of a next pooling operation are inputted to the pooling units 81~85.

Figure 5:
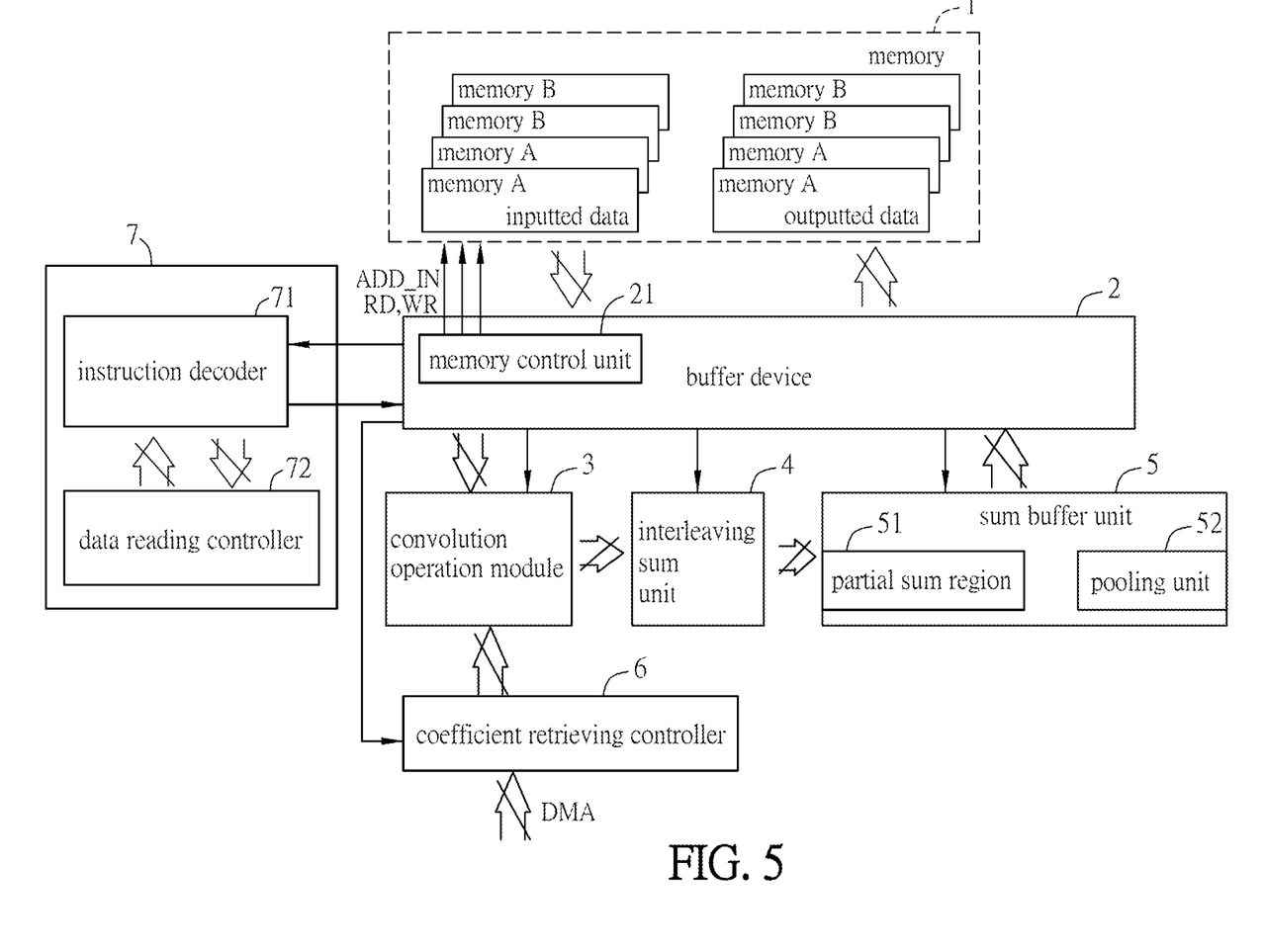
FIG. 5 is a block diagram showing a convolution operation device according to an embodiment of the disclosure.

FIG. 5 is a block diagram showing a convolution operation device according to an embodiment of the disclosure. As shown in FIG. 5, the convolution operation device includes a memory 1, a buffer device 2, a convolution operation module 3, an interleaving sum unit 4, a sum buffer unit 5, a coefficient retrieving controller 6 and a control unit 7. The convolution operation device can be applied to convolutional neural network (CNN).

The memory 1 stores the data for the convolution operations. The data include, for example, image data, video data, audio data, statistics data, or the data of any layer of the convolutional neural network. The image data may contain the pixel data. The video data may contain the pixel data or movement vectors of the frames of the video, or the audio data of the video. The data of any layer of the convolutional neural network are usually 2D array data, such as 2D array pixel data. In this embodiment, the memory 1 is a SRAM (static random-access memory), which can store the data for convolution operation as well as the results of the convolution operation. In addition, the memory 1 may have multiple layers of storage structures for separately storing the data for the convolution operation and the results of the convolution operation. In other words, the memory 1 can be a cache memory configured in the convolution operation device.

All or most data can be stored in an additional device, such as another memory (e.g. a DRAM (dynamic random access memory)). All or a part of these data are loaded into the memory 1 from the another memory when executing the convolution operation. Then, the buffer device 2 inputs the data into the convolution operation module 3 for executing the convolution operations. If the inputted data are from the data stream, the latest data of the data stream are written into the memory 1 for the convolution operations.

The buffer device 2 is coupled to the memory 1, the convolution operation module 3 and a part of the interleaving buffer unit 5. In addition, the buffer device 2 is also coupled to other components of the convolution operation device such as the interleaving sum unit 4 and the control unit 7. Regarding to the image data or the frame data of video, the data are processed column by column and the data of multiple rows of each column are read at the same time. Accordingly, within a clock, the data of one column and multiple rows in the memory 1 are inputted to the buffer device 2. In other words, the buffer device 2 is functioned as a column buffer. In the operation, the buffer device 2 can retrieve the data for the operation of the convolution operation module 3 from the memory 1, and modulate the data format to be easily written into the convolution operation module 3. In addition, the buffer device 2 is also coupled with the sum buffer unit 5, the data processed by the sum buffer unit 5 can be reordered by the buffer device 2 and then transmitted to and stored in the memory 1. In other words, the buffer device 2 has a buffer function as well as a function for relaying and registering the data. In more precisely, the buffer device 2 can be a data register with reorder function.

To be noted, the buffer device 2 further includes a memory control unit 21. The memory control unit 21 can control the buffer device 2 to retrieve data from the memory 1 or write data into the memory 1. Since the memory access width (or bandwidth) of the memory 1 is limited, the available convolution operations of the convolution operation module 3 is highly related to the access width of the memory 1. In other words, the operation performance of the convolution operation module 3 is limited by the access width. When reaching the bottleneck of the input from the memory, the performance of the convolution operation can be impacted and decreased.

The convolution operation module 3 includes a plurality of convolution units, and each convolution unit executes a convolution operation based on a filter and a plurality of current data. After the convolution operation, a part of the current data is remained for the next convolution operation. The buffer device 2 retrieves a plurality of new data from the memory 1, and the new data are inputted from the buffer device 2 to the convolution unit. The new data are not duplicated with the current data. The convolution unit of the convolution operation module 3 can execute a next convolution operation based on the filter, the remained part of the current data, and the new data. The interleaving sum unit 4 is coupled to the convolution operation module 3 and generates a characteristics output result according to the result of the convolution operation. The sum buffer unit 5 is coupled to the interleaving sum unit 4 and the buffer device 2 for registering the characteristics output result. When the selected convolution operations are finished, the buffer device 2 can write all data registered in the sum buffer unit 5 into the memory 1.

The coefficient retrieving controller 6 is coupled to the convolution operation module 3, and the control unit 7 is coupled to the buffer device 2. In practice, the convolution operation module 3 needs the inputted data and the coefficient of filter for performing the related operation. In this embodiment, the needed coefficient is the coefficient of the 3×3 convolution unit array. The coefficient retrieving controller 6 can directly retrieve the filter coefficient from external memory by direct memory access (DMA). Besides, the coefficient retrieving controller 6 is also coupled to the buffer device 2 for receiving the instructions from the control unit 7. Accordingly, the convolution operation module 3 can utilize the control unit 7 to control the coefficient retrieving controller 6 to perform the input of the filter coefficient.

The control unit 7 includes an instruction decoder 71 and a data reading controller 72. The instruction decoder 71 receives an instruction from the data reading controller 72, and then decodes the instruction for obtaining the data size of the inputted data, columns and rows of the inputted data, the characteristics number of the inputted data, and the initial address of the inputted data in the memory 1. In addition, the instruction decoder 71 can also obtain the type of the filter and the outputted characteristics number from the data reading controller 72, and output the proper blank signal to the buffer device 2. The buffer device 2 can operate according to the information provided by decoding the instruction as well as controlling the operations of the convolution operation module 3 and the sum buffer unit 5. For example, the obtained information may include the clock for inputting the data from the memory 1 to the buffer device 2 and the convolution operation module 3, the sizes of the convolution operations of the convolution operation module 3, the reading address of the data in the memory 1 to be outputted to the buffer device 2, the writing address of the data into the memory 1 from the sum buffer unit 5, and the convolution modes of the convolution operation module 3 and the buffer device 2.

In addition, the control unit 7 can also retrieve the needed instruction and convolution information from external memory by data memory access. After the instruction decoder 71 decodes the instruction, the buffer device 2 retrieves the instruction and the convolution information. The instruction may include the size of the stride of the sliding window, the address of the sliding window, and the numbers of columns and rows of the image data.

The sum buffer unit 5 is coupled to the interleaving sum unit 4. The sum buffer unit 5 includes a partial sum region 51 and a pooling unit 52. The partial sum region 51 is configured for registering data outputted from the interleaving sum unit 4. The pooling unit 52 performs a pooling operation with the data registered in the partial sum region 51. The pooling operation is a max pooling or an average pooling.

For example, the convolution operation results of the convolution operation module 3 and the output characteristics results of the interleaving sum unit 4 can be temporarily stored in the partial sum region 51 of the sum buffer unit 5. Then, the pooling unit 52 can perform a pooling operation with the data registered in the partial sum region 51. The pooling operation can obtain the average value or max value of a specific characteristics in one area of the inputted data, and use the obtained value as the fuzzy-rough feature extraction or statistical feature output. This statistical feature has lower dimension than the above features and is benefit in improving the operation results.

To be noted, the partial operation results of the inputted data are summed (partial sum), and then registered in the partial sum region 51. The partial sum region 51 can be referred to a PSUM unit, and the sum buffer unit 5 can be referred to a PSUM buffer module. In addition, the pooling unit 52 of this embodiment obtains the statistical feature output by above-mentioned average pooling. After inputted data are all processed by the convolution operation module 3 and the interleaving sum unit 4, the sum buffer unit 5 outputs the final data processing results. The results can be stored in the memory 1 through the buffer device 2, and outputted to other components through the memory 1. At the same time, the convolution operation module 3 and the interleaving sum unit 4 can continuously obtain the data characteristics and perform the related operations, thereby improving the process performance of the convolution operation device.

The convolution operation device may include a plurality of convolution operation modules 3. The convolution units of the convolution operation modules 3 and the interleaving sum unit 4 can be optionally operated in the low-scale convolution mode or a high-scale convolution mode. In the low-scale convolution mode, the interleaving sum unit 4 is configured to sum results of the convolution operations of the convolution operation modules 3 by interleaving so as to output sum results. In the high-scale convolution mode, the interleaving sum unit 4 is configured to sum the results of the convolution operations of the convolution units as outputs.

Figure 6:
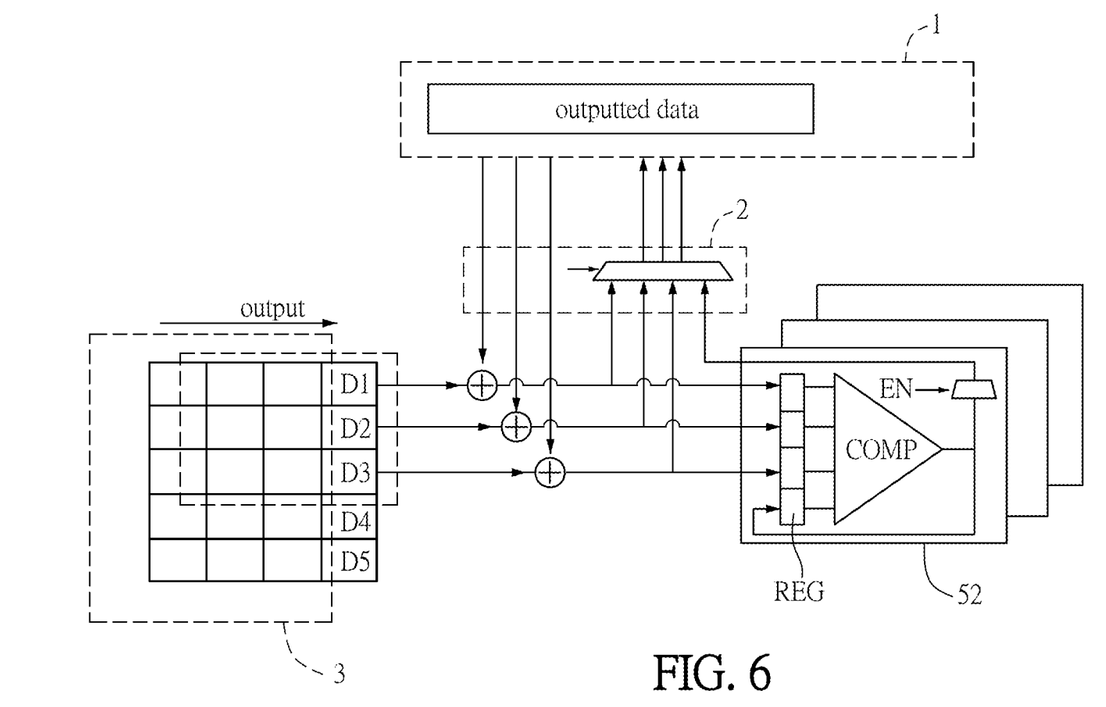
FIG. 6 is a schematic diagram showing a max pooling operation according to an embodiment of the disclosure.
Figure 7:
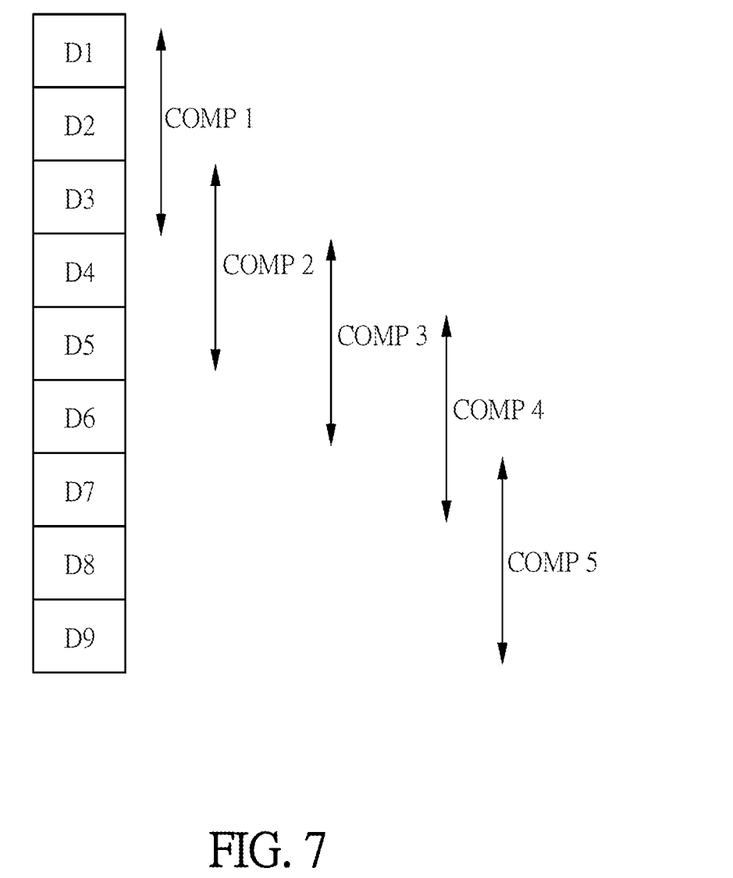
FIG. 7 is a schematic diagram showing the supported range of the max pooling operation of FIG. 6.

FIG. 6 is a schematic diagram showing a max pooling operation according to an embodiment of the disclosure. As shown in FIG. 6, the data of the same column are together read from the convolution operation module 3 or the memory 1, and the read data can be the pixel data of an image. These data can be classified to max pooling (e.g. 2×2 or 3×3) and inputted to the corresponding max pooling unit. In this embodiment, the sum buffer unit 5 includes a plurality of pooling units 52, and each pooling unit 52 includes a register set REG, a comparator COMP, and an output switch. The comparator COMP has four inputs and one output. The register set REG has four registers, which can output the stored data to the comparator COMP. Three of the registers can receive and store the data read from the convolution operation module 3 or the memory 1, and the residual register can receive the output of the comparator COMP and store the maximum value of the outputs of the comparator COMP. The comparator COMP can compare the three inputted data and the maximum value of the previous comparison so as to output the maximum value. In other words, the maximum value outputted by the comparator COMP in the previous clock is registered in the register, so that it can be provided for next comparison with other new inputted data in the next clock. The other new inputted data are, for example, the data of next column or consecutive column. The required clocks for the operation of the pooling unit 52 depend on the scale of the pooling operation, and are usually 2-3 clocks. After the pooling unit 52 finishes a round of max pooling operation, an ending signal EN can enable the output switch to output the obtained maximum value, and the registers are reset to the minimum value for the next max pooling operation. Next, the output switch is disabled in the next clock or the consecutive clock, and the registers can receive and store the data read from the convolution operation module 3 or the memory 1. In this architecture, as shown in FIG. 7, five comparators COMP1~COMP5 can process the pooling window with nine data D1~D9 in each column so as to perform the max pooling operation.

In summary, the operation device and method of the disclosure have pooling units of two orders connected in series for performing overlapping pooling operation. The first-order pooling unit can perform a first round of operation with the column data to generate an output result, which is saved in the FIFO buffer. After the first-order pooling unit performs a second round of operation with next column data, the new output result can replace at least one of the column data output results of the first-round operation stored in the buffer. Then, all of the pooling operation results stored in the FIFO buffer are outputted to the second-order pooling units for performing the second-order pooling operation, thereby obtaining the finial pooling operation result. When a part of the row data in the pooling window is not yet processed by the convolution operation, it is possible to perform the pooling operation with the row data that have been processed by the pooling operation. The obtained partial pooling operation results can be stored in the row buffer. After the new data in the pooling window are processed by the convolution operation, the new data and the partial pooling operation results stored in the row buffer are provide to perform the column pooling operation so as to obtain the final pooling operation result. Accordingly, the operation device and method of the disclosure can perform the pooling operations for a large amount of data with limited reading bandwidth, thereby enhancing the pooling operation performance.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A pooling operation method for a convolutional neural network, comprising steps of:
   reading multiple current reading-in elements of one current reading-in column in a pooling window at a current position during a current cycle;
   performing a first forward max pooling operation of one pooling layer for a partial portion of the pooling window on the current reading-in elements of the current reading-in column to generate at least a current column pooling result for the current position;
   storing the current column pooling result for the current position at the one pooling layer in a first-in-first-out buffer;
   performing a second forward max pooling operation of the one pooling layer for a whole portion of the pooling window at the current position on the current column pooling result and multiple preceding column pooling results of the first forward max pooling operation stored in the first-in-first-out buffer to generate a pooling result of the whole portion of the pooling window at the one pooling layer at the current position during the current cycle, wherein the preceding column pooling results are respectively generated by the first forward max pooling operation with preceding read-in elements of multiple preceding read-in columns in the pooling window at previous positions during previous cycles which are previous to the current cycle, and the preceding read-in columns are previous columns to the current reading-in column in the pooling window;
   reading multiple next reading-in elements of one next reading-in column in the pooling window at a next position during a next cycle;
   performing the first forward max pooling operation of the one pooling layer for a partial portion of the pooling window on the next reading-in elements of the next reading-in column to generate at least a next column pooling result for the next position;
   storing the next column pooling result for the next position at the one pooling layer in the first-in-first-out buffer to overwrite the preceding read-in elements of one column of the preceding read-in columns; and
   performing the second forward max pooling operation of the one pooling layer for the whole portion of the pooling window at the next position on column pooling results stored in the first-in-first-out buffer to generate a pooling result of the whole portion of the pooling window at the one pooling layer at the next position during the next cycle.

2. The pooling operation method of claim 1, wherein the current reading-in elements each is a result of a convolution operation, and the current reading-in elements are not stored in the first-in-first-out buffer before the reading step.

3. The pooling operation method of claim 1, wherein the size of the first-in-first-out buffer is greater than or equal to a number of rows of the pooling window.

4. The pooling operation method of claim 1, wherein a stride of the pooling window is S, and the step of performing the second forward max pooling operation for the whole portion of the pooling window is after the first-in-first-out buffer stores S of the column pooling results.

5. A pooling operation device of a convolutional neural network, comprising:

a first-order forward max pooling circuit comprising input terminals configured to receive multiple current reading-in elements of one current reading-in column in a pooling window at a current position during a current cycle, and configured to perform a first forward max pooling operation of one pooling layer for a partial portion of the pooling window on the current reading-in elements of the current reading-in column to generate at least a current column pooling result for the current position;

a first-in-first-out buffer coupled to the first-order forward max pooling circuit to store the current column pooling result for the current position and multiple preceding column pooling results at the one pooling layer, wherein the preceding column pooling results are respectively generated by the first-order forward max pooling circuit with preceding read-in elements of multiple preceding read-in columns in the pooling window at previous positions during previous cycles which are previous to the current cycle, and the preceding read-in columns are previous columns to the current reading-in column in the pooling window; and a second-order forward max pooling circuit connected to the first-order forward max pooling circuit through the first-in-first-out buffer in series and coupled to the first-in-first-out buffer to receive the current column pooling result and the preceding column pooling results, and configured to perform a second forward max pooling operation of the one pooling layer for a whole portion of the pooling window on the current column pooling result and the preceding column pooling results stored in the first-in-first-out buffer to generate a pooling result of the whole portion of the pooling window at the one pooling layer at the current position during the current cycle;

wherein the input terminals of the first-order forward max pooling circuit are configured to receive multiple next reading-in elements of one next reading-in column in the pooling window at a next position during a next cycle, and configured to perform the first forward max pooling operation of the one pooling layer for a partial portion of the pooling window on the next reading-in elements of the next reading-in column to generate at least a next column pooling result for the next position;

wherein the first-in-first-out buffer is configured to store the next column pooling result for the next position at the one pooling layer in the first-in-first-out buffer to overwrite the preceding read-in elements of one column of the preceding read-in columns; and wherein the second-order forward max pooling circuit is configured to perform the second forward max pooling operation of the one pooling layer for the whole portion of the pooling window at the next position on column pooling results stored in the first-in-first-out buffer to generate a pooling result of the whole portion of the pooling window at the one pooling layer at the next position during the next cycle.

6. The pooling operation device of claim 5, wherein the current reading-in elements each is a result of a convolution operation, and the current reading-in elements are not stored in the first-in-first-out buffer before the first-order forward max pooling circuit reads the current reading-in elements.

7. The pooling operation device of claim 5, wherein the size of the first-in-first-out buffer is greater than or equal to a number of rows of the pooling window.

8. The pooling operation device of claim 5, wherein a stride of the pooling window is S, and the second forward max pooling operation for the whole portion of the pooling window is performed after the first-in-first-out buffer stores S of the column pooling results.

* * * * *